3,519,671
SILICON MODIFIED BORATE COMPOSITIONS
Mark Markovitz, Schenectady, N.Y., assignor to General Electric Company, a corporation of New York
No Drawing. Filed Dec. 20, 1966, Ser. No. 603,124
Int. Cl. C07f 5/02, 7/02
U.S. Cl. 260—448.2          5 Claims

ABSTRACT OF THE DISCLOSURE

Reaction products of boric acid material with silanols and alcohol or phenolic material are used to cure epoxy resins to form hard, transparent, glassy materials which are characterized by low high temperature dissipation factor and other desirable properties.

---

This invention relates to the curing of epoxy resins and to curing agents therefor. More particularly, the invention relates to the curing of epoxy resins with silicone modified borates to produce hard, glassy, cured materials which have good high temperature dissipation factor and other desirable properties.

The use of various boron compounds in the curing of epoxy resins is well known. For example, borate esters such as tricresyl borate, tributyl borate, and the like have been used to cure epoxy resins. It has also been known as set forth in U.S. Pat. 2,953,543 to cure epoxy resins with mixtures of boron-containing esters and organosilicone materials. It has unexpectedly been found that epoxy resins having desirable electrical and physical characteristics can be prepared by using as the curing agent the novel reaction products of boric acid or boric acid derivatives, silanols and an alcohol or phenolic compound. Generally speaking, from about 10 to 50 percent by weight of such boron compound is used to provide cured epoxy resins having desirable characteristics.

Those features of the invention which are believed to be novel are set forth with particularity in the claims appended hereto. The invention, however, will be better understood from a consideration of the following description.

The curing agent reaction products of boric acid or derivatives, silanol and alcohol or phenolic compound can be prepared from any of a number of materials as well as from mixtures of each type of reactant. Boric acid itself may be used as the boron donor as can boric acid derivatives such as phenyl boric acid, butyl boric acid, dodecyl boric acid, nonyl boric acid, cyclohexyl boric acid, octadecyl boric acid, m-phenylene diboric acid, p-phenylene diboric acid and the like. Esters and other derivatives of boric acid are also useful.

Likewise, any of a number of silanols can be used including but not limited to diphenylsilane diol, triphenylsilanol, 1,3 - dihydroxytetraphenyldisiloxane, 1,3 - dihydroxy-1,3-diphenyl-1,3-diethyldisiloxane, methyldiphenylsilanol, 1 - hydroxy-1-phenyl-3,3,5,5-tetramethylcyclotrisiloxane, 1,5-dihydroxyhexaphenyltrisiloxane, 1-hydroxy-heptaphenyltrisiloxane, 1,5-dihydroxy-3,3-dimethyl-1,1,5,5 - tetraphenyltrisiloxane, 1-hydroxy-1,1-diphenyl-3,3,3-trimethyldisiloxane, 1,3 - dihydroxy - 1,1-diphenyl-3,3-dimethyldisiloxane, 1,7 - dihydroxyoctaphenyltetrasiloxane, etc.

Among the alcohols which have been found to be useful in connection with the present invention are n-amyl alcohols, 2-butoxy ethanol, trimethylol propane dialyl ether, 3-methyl-1-butanol, 1-hexanol, 3-methyl-1-pentanol, tetrahydropyran-2-methanol, 2-methoxyethanol, 1-hydroxy-1-ethoxypropane, 1-hydroxy-4-methoxybutane, 2-hexanol, 3-ethyl-3-pentanol, 2-phenylethanol, cyclohexanol, 3-phenyl-1-propanol, 4,4,4-trichloro-1-butanol, 3-perfluorophenyl-1-propanol, etc.

Any of a number of phenolic compounds can be used such as those prepared from phenol, p-cresol, m-cresol, o-cresol, 4-t-butylphenol, m-ethylphenol, 1-naphthol, 2-naphthol, 3,4-dichlorophenol, 4-hydroxydiphenyl, m-cyclohexylphenol, 3,5 - dimethylphenol, 4-methyl-1-naphthol, 3-ethyl-4-methylphenol, 2,4,5-trimethylphenol, 3,4-dibromophenol, 4,6-dibromo - 2 - naphthol, 4-n-propylphenol, 3-cyclopentylphenol, etc.

Any of the usual epoxy resins containing 1,2 epoxy groups can be used in conjunction with the invention including the usual glycidyl polyesters as well as epoxidized polyolefins and oils and cycloaliphatic epoxy resins as well as mixtures of such epoxies.

The preferred proportions of material range from 0.2 to 0.8 hydroxyl equivalents of silanol and 0.8 to 0.2 hydroxyl equivalents of alcohol or phenolic material per equivalent of hydroxyl from the boric acid material.

The following examples illustrate the preparation of the curing agent and are to be taken as illustrative only of many such materials which fall within the concept of the invention.

EXAMPLE 1

There were added to 225 g. toluene in a reaction vessel with Dean Stark condenser 31 g. (0.5 mole) boric acid, 108 g. (0.5 mole) diphenylsilanediol, and 107 g. (0.5 mole) trimethylolpropane diallyl ether (TMPDAE). The mixture was refluxed with stirring and nearly all of the boric acid had dissolved after 25 g. of the theoretical 27 g. of water had been collected. A viscous oil remained after the toluene was distilled from the reaction mixture. The probable structure of the product is I 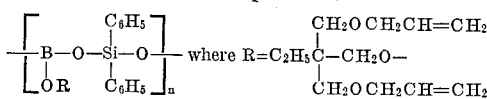

and $n$ is more than one.

EXAMPLE 2

In this example the TMPDAE proportion was increased to produce a less viscous material. Example 1 is was repeated using 37.2 g. (0.6 mole) boric acid, 86.4 g. (0.4 mole) diphenylsilanediol and 214 g. (1.0 mole) TMPDAE. The reaction product can be represented by the average chemical formula II 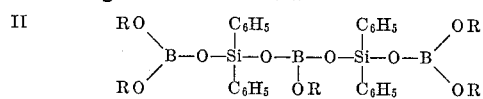

where

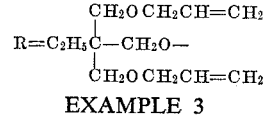

EXAMPLE 3

There was stirred and refluxed in a flask attached to a Dean Stark condenser 56 g. (0.9 mole) boric acid, 130 g. (0.6 mole) diphenylsilanediol and 132 g. (1.5 moles) n-amyl alcohol in 300 g. of toluene. After several hours at about 90° to 110° C., 46 g. of the theoretical 48.6 g. of water had been distilled. A medium viscosity liquid remained after the toluene had been stripped off. The formula corresponds to that of II where $R=C_5H_{11}$.

EXAMPLE 4

Example 3 was repeated using 56 g. (0.9 mole) boric acid, 130 g. (0.6 mole) diphenylsilanediol and 177 g. (1.5 mole) 2-butoxyethanol in 300 g. of toluene which were reacted at a temperature range from about 90° C. to 120° C. When 95 percent of the theoretical water had been distilled off and the toluene stripped from the reaction mixture, a medium viscosity liquid remained. The product corresponds to Formula II where R is $C_4H_9OC_2H_4O-$.

While epoxy resins containing the curing agents of the present invention are characterized by rather short shelf life, being several hours for bisphenol-A diglycidyl ether epoxy resins and about one hour for cycloaliphatic epoxy resins, the gelation process is unexpectedly characterized by a very mild exotherm and curing at room temperature in one or up to several hours or at 70–160° C. for one to sixteen hours for optimum properties. Shown in Table I is the dissipation factor and heat distortion temperature for a mixture of a cycloaliphatic epoxy resin known as ERLA 4221 having an epoxide equivalent weight of from about 126 to 140 and having the following formula

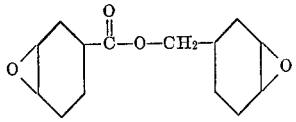

and a bisphenol-A diglycidyl ether epoxy resin known as DER 332 having an epoxide equivalent weight of 172 to 178 and a 25° C. viscosity of 40 to 64 poises. The curing agent is that set forth in Example 1.

TABLE I

| | | |
|---|---|---|
| ERLA | 30 | |
| DER 332 | | 30 |
| Boric acid-diphenylsilanediol-TMPDAE (1.0/1.0/1.0 mole ratio) | 20 | 30 |

| | Dissipation factor (60 cycles, 10 v.p.m.) | |
|---|---|---|
| Temperature, ° C.: | | |
| 25 | <0.001 | <0.001 |
| 75 | <0.001 | <0.001 |
| 100 | <0.001 | <0.001 |
| 135 | <0.001 | <0.001 |
| 155 | <0.001 | 0.02 |
| Heat distortion temperature (° C.) | 110 | (¹) |

¹ Not measured.

Shown in Table II below are the dissipation factor and tensile strength and elongation at break for the stated weight proportions of ERLA 4221 and ERLA 4201 resin using the curing agent described in Example 2. ERLA 4201 resin has an epoxide equivalent weight of from about 145 to 156 and is represented by the following formula:

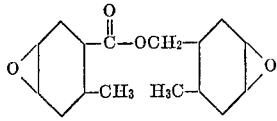

TABLE II

| | | | | | |
|---|---|---|---|---|---|
| ERLA 4221 | 50 | 60 | 70 | | |
| ERLA 4201 | | | | 50 | 70 |
| Boric acid-diphenylsilanediol—TMPDAE (3.0/2.0/5.0 mole ratio) | 50 | 40 | 30 | 50 | 30 |

| | Dissipation factor (60 cycles, 10 v.p.m.) | | | | |
|---|---|---|---|---|---|
| Temperature, ° C.: | | | | | |
| 25 | 0.014 | 0.017 | 0.021 | 0.012 | 0.018 |
| 100 | 0.0083 | 0.015 | 0.020 | 0.0089 | 0.020 |
| 125 | 0.0056 | 0.010 | 0.015 | 0.0058 | 0.015 |
| 150 | 0.0047 | 0.0089 | 0.013 | 0.0040 | 0.012 |
| 175 | 0.0025 | 0.0089 | 0.018 | 0.0047 | 0.018 |
| Tensile strength in p.s.i., 25° C. | 1960 | | 2700 | | |
| Percent elongation at break, 25° C. | 2.0 | | 3.5 | | |

Shown in Table III is the dissipation factor and various physical characteristics of ERLA 4221 epoxy resin cured. Various proportions of the curing agent are set forth in Examples 3 and 4.

TABLE III

| | | | | |
|---|---|---|---|---|
| ERLA 4221 | 50 | 50 | 60 | 80 |
| Boric acid-diphenylsilanediol-n-amyl alcohol (Ex. 3) | | 50 | | |
| Boric acid-diphenylsilanediol-2-butoxy-ethanol (Ex. 4) | 50 | | 40 | 20 |

| | Dissipation factor (60 cycles, 10 v.p.m.) | | | |
|---|---|---|---|---|
| Temperature, ° C.: | | | | |
| 25 | 0.0063 | 0.012 | 0.0081 | 0.010 |
| 75 | 0.0064 | 0.011 | 0.0079 | 0.017 |
| 100 | 0.0053 | 0.0095 | 0.0072 | 0.017 |
| 125 | 0.0044 | 0.0082 | 0.0055 | 0.016 |
| 150 | 0.0053 | 0.012 | 0.0054 | 0.016 |
| 175 | 0.0068 | 0.019 | 0.0043 | 0.014 |
| Tensile strength in p.s.i., 25° C. | 2,150 | | | |
| Percent elongation at break, 25° C. | 3.0 | | | |

It will be noted from the above tables that the present materials are characterized by particularly desirable dissipation factors even at elevated temperatures. They additionally cure rapidly with little exotherm to hard, glassy solids without forming any volatiles.

The favorable electrical and other physical characteristics of the above epoxy resin compositions make them particularly useful as potting compounds for electrical components, as coating materials, and as structural parts.

What I claim as new and desire to secure by Letters Patents of the United States is:

1. The reaction of from 0.2 to 0.8 hydroxyl equivalent of diphenylsilanediol material and 0.8 to 0.2 hydroxy equivalent of a material selected from the group consisting of n-amyl alcohol, trimethylolpropane diallyl ether, 2-butoxy ethanol and phenol and one hydroxyl equivalent of the boric acid hydroxyl.

2. A composition as in claim 1 wherein said silanol is diphenylsilanediol, said alcohol is trimethylolpropane diallyl ether.

3. A composition as in claim 1 wherein one of the ingredients is n-amyl alcohol.

4. A composition as in claim 1 wherein one of the ingredients is 2-butoxy ethanol.

5. A composition as in claim 1 wherein one of said ingredients is phenol.

References Cited

UNITED STATES PATENTS

| | | | |
|---|---|---|---|
| 2,644,805 | 7/1953 | Martin | 260—448.2 X |
| 2,517,945 | 8/1950 | Upson | 260—448.2 X |
| 2,915,543 | 12/1959 | Grossos. | |
| 2,957,900 | 10/1960 | Grossos. | |
| 3,161,613 | 12/1964 | Sprung | 260—448.2 X |

TOBIAS E. LEVOW, Primary Examiner

P. F. SHAVER, Assistant Examiner

U.S. Cl. X.R.

260—2, 448.8

UNITED STATES PATENT OFFICE
CERTIFICATE OF CORRECTION

Patent No. 3,519,671                          Dated  July 7, 1970

Inventor(s) Mark Markovitz

It is certified that error appears in the above-identified patent and that said Letters Patent are hereby corrected as shown below:

Claim 1, line 1, after "reaction" insert - product -

Line 2, delete "hydroxy" and substitute therefor

- hydroxyl -

Last line, delete "hydroxyl"

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents